US009775024B2

(12) United States Patent
Park et al.

(10) Patent No.: US 9,775,024 B2
(45) Date of Patent: Sep. 26, 2017

(54) METHOD FOR CHANGING MNO IN EMBEDDED SIM ON BASIS OF DYNAMIC KEY GENERATION AND EMBEDDED SIM AND RECORDING MEDIUM THEREFOR

(75) Inventors: Jaemin Park, Seoul (KR); Jinhyoung Lee, Seoul (KR); Kwangwuk Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 154 days.

(21) Appl. No.: 14/130,261

(22) PCT Filed: Jul. 6, 2012

(86) PCT No.: PCT/KR2012/005381
§ 371 (c)(1),
(2), (4) Date: Dec. 30, 2013

(87) PCT Pub. No.: WO2013/009045
PCT Pub. Date: Jan. 17, 2013

(65) Prior Publication Data
US 2014/0140507 A1    May 22, 2014

(30) Foreign Application Priority Data

Jul. 8, 2011   (KR) ........................ 10-2011-0067780
Dec. 13, 2011  (KR) ........................ 10-2011-0133562

(51) Int. Cl.
*H04L 29/06*       (2006.01)
*H04W 8/24*        (2009.01)
(Continued)

(52) U.S. Cl.
CPC ......... *H04W 8/245* (2013.01); *H04L 63/0853* (2013.01); *H04W 4/001* (2013.01);
(Continued)

(58) Field of Classification Search
None
See application file for complete search history.

(56) References Cited

U.S. PATENT DOCUMENTS

| 2009/0010434 A1* | 1/2009 | Carles | H04L 63/061 380/255 |
| 2009/0191857 A1* | 7/2009 | Horn | H04W 4/00 455/419 |

(Continued)

FOREIGN PATENT DOCUMENTS

WO    2010/102236 A2    9/2010

OTHER PUBLICATIONS

3GPP TR 33.812 V9.1.0, Feasibility study on the security aspects of remote provisioning and change of subscription for Machine to Machine (M2M) equipment, Release 9, Apr. 11, 2010.

*Primary Examiner* — Hadi Armouche
*Assistant Examiner* — Andrew Steinle
(74) *Attorney, Agent, or Firm* — Sughrue Mion, PLLC (57) ABSTRACT

The present invention Includes using an embedded SIM (eSIM) associated with a newly-opened mobile network operator (MNO) system and a receiving MNO system, the method performs the steps of: generating a security domain (SD) for a receiving MNO on the basis of a request from the newly-opened MNO system; injecting a prior SD key value; installing a secure applet for key generation and secure arithmetic operations, injecting a new SD key value on the basis of a request from the receiving MNO, and transmitting only a public key to the receiving MNO system after generating key pairs for the receiving MNO; and decoding a receiving MNO profile with a private key corresponding to the public key after receiving the receiving MNO profile from the receiving MNO system or the newly-opened MNO system.

14 Claims, 7 Drawing Sheets

(51) Int. Cl.
  *H04W 4/00* (2009.01)
  *H04W 8/18* (2009.01)
  H04W 12/04 (2009.01)
  H04W 12/06 (2009.01)
  H04W 88/06 (2009.01)

(52) U.S. Cl.
  CPC ............ *H04W 8/18* (2013.01); *H04W 8/183* (2013.01); *H04W 12/04* (2013.01); *H04W 12/06* (2013.01); *H04W 88/06* (2013.01)

(56) References Cited

U.S. PATENT DOCUMENTS

| | | | |
|---|---|---|---|
| 2010/0106967 A1 | 4/2010 | Johansson et al. | |
| 2011/0306318 A1* | 12/2011 | Rodgers | H04W 8/183 455/410 |
| 2012/0282924 A1* | 11/2012 | Tagg | H04W 8/04 455/432.1 |

* cited by examiner

METHOD FOR CHANGING MNO IN EMBEDDED SIM ON BASIS OF DYNAMIC KEY GENERATION AND EMBEDDED SIM AND RECORDING MEDIUM THEREFOR

CROSS REFERENCE TO RELATED APPLICATIONS

This application is a National Stage of International Application No. PCT/KR2012/005381, filed Jul. 6, 2012, claiming priority based on Korean Patent Application Nos. 10-2011-0067780, filed Jul. 8, 2011 and KR 10-2011-0133562, filed Dec. 13, 2011, the contents of all of which are incorporated herein by reference in their entirety.

TECHNICAL FIELD

The present invention relates to a method of changing a mobile network operator (MNO) in an embedded subscriber identity module (hereinafter, referred to as an "eSIM" or "eUICC") based on dynamic key generation and an eSIM for the same.

BACKGROUND ART

A Universal Integrated Circuit Card (UICC) is a smart card inserted into a terminal and used as a user authentication module. The UICC may store personal information on a user and information on a mobile network operator of a mobile service subscribed by the user. For example, the UICC may include an International Mobile Subscriber Identity (IMSI) to identify a user. The UICC may also be referred to as a Subscriber Identity Module (SIM) card in the Global System for Mobile Communications (GSM), and as a Universal Subscriber Identity Module (USIM) in the Wideband Code Division Multiple Access (WCDMA).

When the user installs the UICC in a user terminal, user authentication is automatically achieved using the information stored in the UICC, enabling the user to conveniently use the terminal. Further, when the terminal is replaced, the user may installs the UICC detached from the terminal on a new terminal, thereby conveniently changing the terminal.

A terminal required to be small-sized, for example, a terminal for machine-to-machine (M2M) communications, is difficult to make small when manufactured in a UICC detachable structure. Thus, an embedded UICC (eUICC) that is not detachable is introduced. The eUICC records information on the user using the UICC in an International Mobile Subscriber Identity (IMSI) form.

A conventional UICC is detachable from a terminal, and thus a user may open the terminal regardless of a terminal type or a mobile carrier. However, an IMSI may be allocated to an eUICC on the premise that the terminal is available under a particular mobile network operator (MNO) from when manufactured. Thus, both MNOs and M2M terminal makers to sell terminals cannot but pay close attention to goods in stock and a rise in product price may occur. Also, users may undergo inconvenience of not allowing a change of MNOs for terminals. Thus, users require a method of opening a terminal regardless of mobile carriers even for an eUICC.

Meanwhile, recent introduction of an eUICC brings a need to update information on subscribers to a plurality of mobile carriers to the UICC remotely, and accordingly a subscription manager (SM) or profile manager (PM) for managing information on subscribers is discussed.

However, due to a physical difference from a conventional detachable SIM, the eSIM environment involves management of SIM data in a software form, and accordingly methods based on GLOBALPLATFORM technology are currently under discussions. However, an MNO may need to lead providing eSIM based services, instead of a third party, due to issues about ownership of keys and initiative in eSIM based business (communications and optional services) on GLOBALPLATFORM, but no concrete measures have been found yet.

DISCLOSURE OF INVENTION

Technical Problem

An aspect of the present invention is to provide a method and an apparatus for managing an embedded subscriber identity module (eSIM) and conducting a mobile network operator (MNO) change based on GLOBALPLATFORM in a communication environment including the eSIM.

An aspect of the present invention is to provide a method and an apparatus for managing an eSIM and conducting an MNO change by generating a dynamic key in a communication environment including the eSIM.

An aspect of the present invention is to provide a method and an apparatus for managing an eSIM and conducting an MNO change using a security domain (SD) in a communication environment including the eSIM.

An aspect of the present invention is to provide a method and an apparatus for conducting an MNO change of an eSIM using a key dynamically generate along with an SD.

An aspect of the present invention is to provide a method and an apparatus for generating an SD for an authorized MNO using an issuer security domain (ISD) and encoding a profile using a key dynamically generated by an eSIM.

Technical Solutions

According to an aspect of the present invention, there is provided a method of changing a mobile network operator (MNO) using an embedded Subscriber Identity Module (eSIM) linked to at least one MNO, the eSIM storing a provisioning profile and a profile of the at least one MNO, the method including generating a security domain (SD) for a receiving MNO by a donor MNO using an issuer security domain (ISD), injecting a new SD key into the eSIM by the receiving MNO, generating a key pair, encrypting a public key using the new SD key and transmitting the public key to the receiving MNO by a secure applet installed in the eSIM according to a request from the receiving MNO, and encrypting a profile of the receiving MNO using the public key and transmitting the profile to the eSIM through the donor MNO by the receiving MNO.

According to an aspect of the present invention, there is provided a method of providing an optional service using an eSIM linked to an initially opening MNO and a serving MNO currently providing a service, the method including encrypting an application or data needed for an optional service using a public key and transmitting the application or data to the initially opening MNO by the serving MNO, conducting ISD key authentication with the eSIM, second-encrypting the data, encrypted with the public key, using an ISD key and transmitting the data to the eSIM by the initially opening MNO, and decrypting the encrypted data using a secure applet installed in the eSIM by the eSIM.

According to an aspect of the present invention, there is provided an eSIM linked to an initially opening MNO and a receiving MNO, the eSIM generating an SD for the receiving MNO according to a request from the initially opening MNO, injecting a prior SD key value, installing a secure applet for key generation and secure arithmetic operations, injecting a new SD key value according to a request from the receiving MNO, generating a key pair for the receiving MNO, transmitting only a public key to the receiving MNO, and decrypting a profile of the receiving MNO using a private key corresponding to the public key after receiving the profile of the receiving MNO encrypted with the public key from the receiving MNO or initially opening MNO.

According to an aspect of the present invention, there is provided a method of changing an MNO using an eSIM linked to an initially opening MNO, a donor MNO and a receiving MNO, the method including receiving an MNO change request from the receiving MNO by the initially opening MNO, deleting a profile of the donor MNO from the eSIM by the initially opening MNO after conducting ISD key authentication with the eSIM using an ISD; generating an SD for the receiving MNO by the initially opening MNO, injecting a new SD key into the eSIM by the receiving MNO, generating a key pair, encrypting a public key using the new SD key and transmitting the public key to the receiving MNO by a secure applet installed in the eSIM according to a request from the receiving MNO, and encrypting a profile of the receiving MNO using the public key and transmitting the profile to the eSIM through the donor MNO by the receiving MNO.

According to an aspect of the present invention, there is provided an eSIM linked to an initially opening MNO, a donor MNO and a receiving MNO, the eSIM including a secure applet which generates a key pair for the receiving MNO and transmits only a public key to the receiving MNO after authenticating a new SD key value transmitted from the receiving MNO according to an MNO change, and decrypts an encrypted profile of the receiving MNO using a private key corresponding to the public key when the encrypted profile is received.

According to an aspect of the present invention, there is provided an eSIM including an ISD and a profile for an initially opening MNO, an SD, a profile and a set of a secure applet for one or more additional MNOs, and a provisioning file for the initially opening MNO, wherein the secure applet is installed according to a request from the initially opening MNO, generates a key pair for one of the additional MNOs based on authentication of a new SD key transmitted from the additional MNO and transmits only a public key to the additional MNO.

According to an aspect of the present invention, there is provided an initially opening MNO linked to one or more MNOs and an eSIM, the initially opening MNO conducting ISD authentication with the eSIM, generating an SD for a receiving MNO, injecting a prior SD key determined in advance into the eSIM, installing a secure applet for the receiving MNO in the eSIM, receiving a profile encrypted with a public key of the receiving MNO from the receiving MNO, additionally encrypting the profile using an ISD key and transmitting the profile to the eSIM when an MNO change request is received from a receiving MNO.

According to an aspect of the present invention, there is provided a recoding medium recording a program installed in an eSIM linked to an initially opening MNO, a donor MNO and a receiving MNO, the program performing a function of authenticating a new SD key value transmitted from the receiving MNO according to an MNO change, a function of generating a key pair for the receiving MNO and transmitting only a public key to the receiving MNO, and a function of decrypting an encrypted profile of the receiving MNO using a private key corresponding to the public key when the encrypted profile is received.

According to an aspect of the present invention, there is provided a recoding medium recording a program installed in an eSIM linked to an initially opening MNO and a receiving MNO, the program performing a function of generating an SD for the receiving MNO, injecting a prior SD key value, and installing a secure applet for key generation and secure arithmetic operations according to a request from the initially opening MNO, a function of injecting a new SD key value according to a request from the receiving MNO, generating a key pair for the receiving MNO and transmitting only a public key to the receiving MNO, and a function of decrypting an encrypted profile of the receiving MNO using a private key corresponding to the public key after receiving the profile of the receiving MNO encrypted using the public key from the receiving MNO or the initially opening MNO.

MODE FOR CARRYING OUT THE INVENTION

Hereinafter, some exemplary embodiments will be described with reference to the accompanying drawings. Like reference numerals in the drawings refer to like elements throughout. In the following description, when detailed descriptions about related well-known functions or structures are determined to make the invention unclear, the detailed descriptions will be omitted herein.

A machine-to-machine (M2M) terminal actively discussed in the Global System for Mobile Communications (GSM) Association (GSMA) is required to be small characteristically. However, when a conventional Universal Integrated Circuit Card (UICC) is used, a separate module which the UICC is mounted on is needed and inserted into the M2M terminal. Thus, when the M2M terminal is manufactured with a UICC-detachable structure, it is difficult to make the M2M small.

Thus, an embedded UICC (eUICC), which is not detachable, is examined. Here, the eUICC mounted on the M2M terminal necessarily stores information on a mobile network operator (MNO) using the UICC in a form of international mobile subscriber identity (IMSI).

However, since the terminal may be allocated the IMSI in the eUICC on the premise that the terminal is available under a particular MNO from when manufactured, both MNOs and M2M terminal makers to sell M2M terminals or UICCs cannot but pay close attention to goods in stock and a rise in product price may occur, which blocks spread of M2M terminals.

As such, unlike a conventional detachable subscriber identity module (SIM), an eUICC or eSIM mounted integrally on a terminal involves many issues about authority to open up an account, initiative in optional service business and subscriber information security due to differences in physical structure. To this end, an international standardization organization such as the GSMA and the European Telecommunications Standards Institute (ETSI) is developing standardizing activities with respect to necessary elements including and a top structure along with related companies such as operators, manufacturers and SIM makers. During discussions on the eSIM, the standardization association centers on a subscription manager (SM), which refers to an entity or function/role to conduct general management of the eSIM, for example, issuing operator information (also referred to as an operator credential, MNO credential, profile, eUICC profile or profile package) to the eSIM and dealing with processes of subscription change or MNO change.

Recently, the GSMA suggests a structure that functions of the SM are divided into SM-data preparation (SM-DP) responsible for generating operator information and SM-secure routing (SM-SR) for directly carrying operator information to the eSIM, and a method of encoding and transmitting a profile, both of which lack technicalities.

In this specification, the eSIM and the eUICC are used to refer to equivalent concepts.

An eSIM is a new concept of SIM technology, which is manufactured by attaching an integrated circuit (IC) chip to a circuit board of a terminal and issuing SIM data (service opening information and optional service information) in a software form over the air (OTA) or via an offline method (technology-based connection of a PC and a USB) in manufacture of the terminal. The IC chip used for the eSIM generally supports a hardware-based crypto co-processor (CCP) to provide generation of a hardware-based public key, and an SIM platform (for example, Java Card Platform) provides an application programming interface (API) for utilizing the public key based on an application (for example, applet). The Java Card Platform is a platform which enables a smart card to have a multi-application and to provide services.

For reasons of limited memory space and security, everyone is not allowed to mount an application on the SIM, and thus not only a platform for mounting an application but also an SIM service management platform responsible for mounting and managing an application on the SIM is needed. The SIM service management platform issues data to an SIM memory area through authentication and security using a management key, and uses specifications of GLOBALPLATFORM, Remote File Management (RFM) and Remote Application Management (RAM) of the ETSI TS 102.226.

An SM as one of important elements in an eSIM environment serves to remotely issue communication and optional service data through a management key, such as a UICC OTA key and a GP ISD key.

The GAMA may divide the functions of the SM into SM-DP and SM-SR. The SM-DP serves to securely build not only an operation profile or operator information but an IMSI, K, OPc, optional service applications and optional service data into a credential package, while the SM-SR serves to securely download the credential package generated in the SM-DP to the eSIM through SIM remote management technology such as OTA or GP secure communication protocol (SCP).

Figure 1:
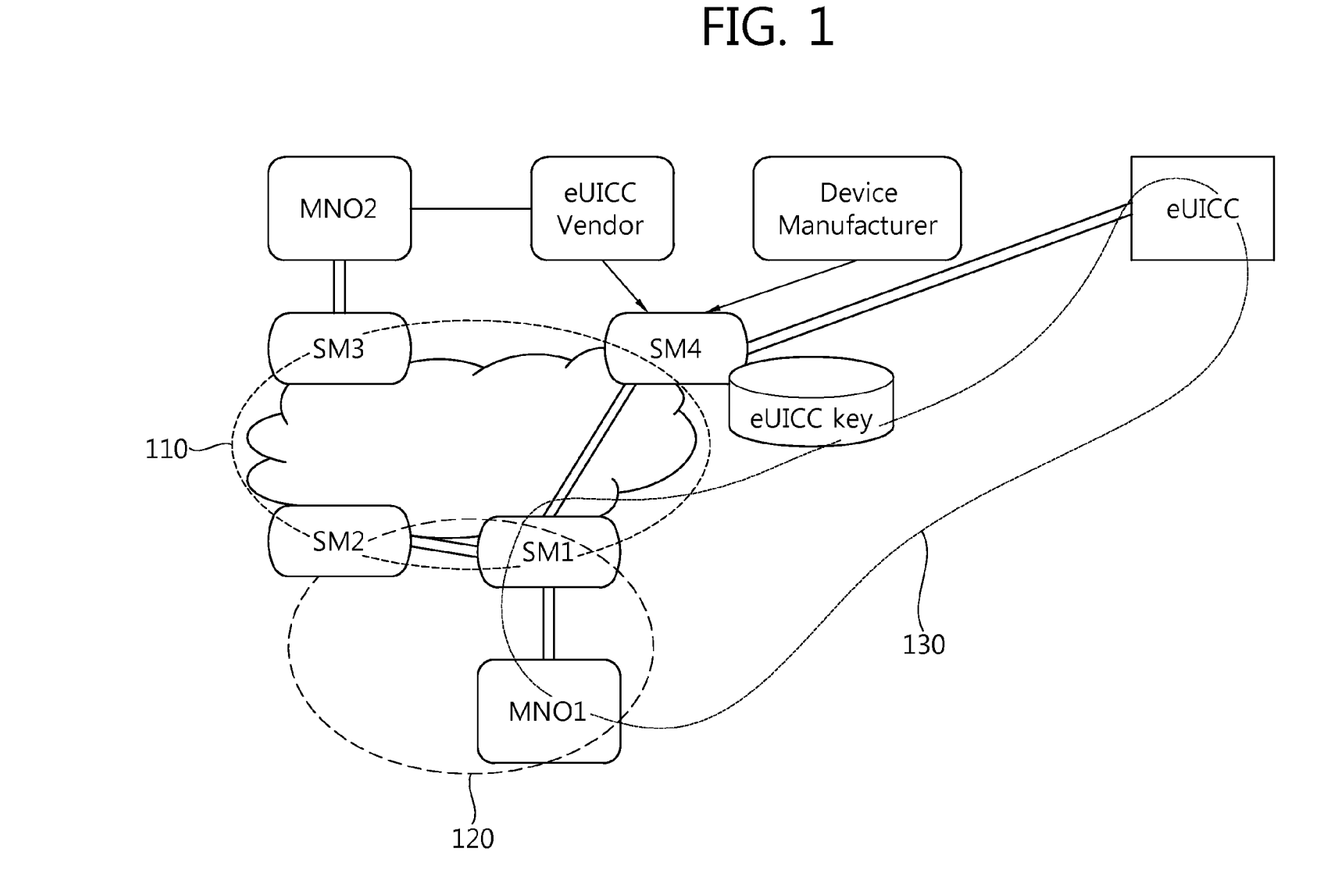
FIG. 1 illustrates an entire service architecture including an eSIM or eUICC according to the present invention.

FIG. 1 illustrates an eSIM communication system including an SM.

An architecture of the eSIM communication system using the SM may include a plurality of MNO systems, at least one SM system, an eUICC manufacturer system, a manufacturer system of a device including the eUICC, and an eUICC. In FIG. 1, a dotted line indicates a circle of trust and two solid lines indicate secure links.

In FIG. 1, a structure "circle of trust" is introduced to overlap relationship between similar objects or entities, thus establishing end-to-end trusted relationship between an MNO and an eSIM. That is, MNO1 builds trusted relationship with SM1, SM1 with SM4, and SM4 with the eSIM, thereby ultimately establishing trusted relationship between the MNO and the eSIM.

The eSIM communication system using the SM adopts a function defined as an SM, and a main function of the SM prepares and transmits a package or profile including an MNO credential to the eUICC. The SM function may be directly provided by the MNO, or the MNO may make a contract with a third entity to acquire an SM service. The SM function needs providing by the MNO or third entity. The SM service may be provided by the third entity when commercial relationship is established between the SM and the MNO.

The SM is divided into an SM-DP to securely prepare a plurality profiles related to the eUICC, such as an operation profile and a provisioning profile of the MNO, and an SM-SR to route the profiles, wherein the SM-SR may be linked with a plurality of other SM-SRs based on trusted relationship and the SM-DP is linked to the MNO system.

In the system using the SM of FIG. 1, the SM performs overall management, such as subscription management, optional service management and MNO change management. However, such a system is different from a current communication service led by the MNO and thus may face problems in securing compatibility or reliability.

Meanwhile, GLOBALPLATFORM is used as a specification of an SIM service management platform.

GLOBALPLATFORM is a specification for secure and dynamic card and application management and provides an interface neutral about a card component, an instruction set, a transaction sequence, hardware, a system and an operating system (OS) and independent of applications.

The present invention may provide a structure of issuing an MNO profile to a terminal and enabling the terminal to switch to another mobile carrier without changing conventional SIM technology in an environment where the MNO owns an issuer security domain (ISD) key on the GLOBALPLATFORM basis.

To this end, an exemplary embodiment of the present invention provides a method of generating an ISD in an eSIM for managing a profile of an initially opening MNO (MNO1) and for controlling SD generation of an additional MNO and installation of a secure applet and of generating and managing an SD for one or more MNOs using an IDS and a security domain (SD) defined in GLOBALPLATFORM. A detailed configuration of the present invention will be described with reference to FIG. 3.

Figure 2:
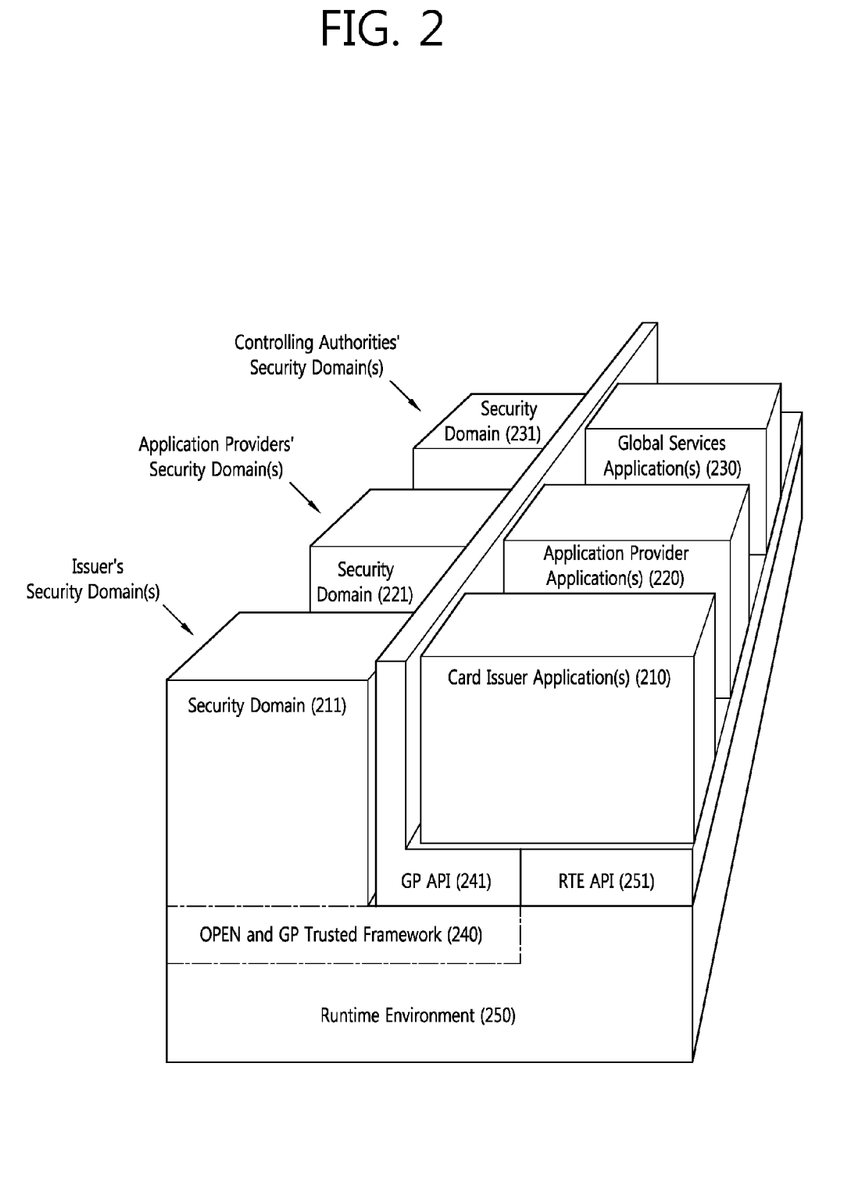
FIG. 2 illustrates a card architecture based on GLOBALPLATFORM according to the present invention.

FIG. 2 illustrates a card architecture based on GLOBALPLATFORM according to the present invention.

The card architecture based on GLOBALPLATFORM includes a plurality of components to secure an interface neutral on hardware and a vendor to an application and an off-card management system.

Such components may include at least one card issuer application 210 for a card issuer, at least one application provider application 220 for a business partner of the card issuer, that is, an application provider, and at least one global service application 230 for providing a global service, for example, a CSM service, to another application.

Each application is associated with a relevant SD, which includes an issuer SD (ISD) 211, a service provider SD 221 and a controlling authority SD 231.

All applications are implemented in a secure runtime environment 250 including an API neutral on hardware supporting mobility of the applications. GLOBALPLATFORM does not limit a runtime environment to particular runtime environment technology and is a major card component that a card manager serves as a central manager. A special key and a security management application called an SD are generated to secure complete separation of keys between the card issuer and a plurality of different SD providers.

A GLOBALPLATFORM environment (OPEN) and a GP trusted framework 240 are disposed under the applications and the SDs, and the runtime environment 250 is formed thereunder.

Further, a GP API 241 is provided between the applications/SDs and the GLOBALPLATFORM environment (OPEN) and the GP trusted framework 240, and a runtime API (RTE API) 251 is provided between the applications/SDs and the runtime environment 250.

The SDs, such as the ISD 211, the service provider SD 221 and the controlling authority SD 231, serves as on-card representatives of off-card authorities. The SDs may be largely divided into three types according to three types of off-card authorities perceived by a card.

First, the ISD 211 is a main and essential on-card representative for a card administrator that is generally a card issuer.

Second, a supplementary SD functions as an additional and optional on-card representative for a card issuer, an application provider or an agent thereof. The service provider SD 221 is the supplementary SD (SSD).

Third, a controlling authority SD is a special supplementary SD. A controlling authority serves to compel a security policy applied to all application codes loaded into a card. Also, the controlling authority may use a controlling authority SD as an on-card representative thereof so as to provide such function. At least one controlling authority SD may be present.

Generally, three types of SDs may be simply referred to as SDs, which support security services, such as key handling, encoding, decoding, creating an electronic signature and verification, for the providers thereof (the card issuer, the application provider or the controlling authority. Each SD is set up instead of the card issuer, the application provider or the controlling authority when an off-card entity requests use of a completely isolated key.

Meanwhile, at least one global service application 230 is present in the card, thereby providing a cardholder verification method (CVM) service to another application on the card.

GLOBALPLATFORM is used to enable operations in a secure multi-application card runtime environment. The runtime environment 250 provides not only secure storage and implementation space for applications but an API neutral on hardware for the applications, so that a code and data of each application are securely retained separately from another application. The runtime environment of the card also provides a communication service between the card and an off-card entity.

The GLOBALPLATFORM card may include at least one trusted framework 240, which provides communications between applications. The trusted framework is neither an application nor SD but may exists as an extension or part of the card runtime environment.

As described above, GLOBALPLATFORM is a specification for managing applications (applets) of a smart card, such as an SIM. GLOBALPLATFORM defines software representing a card issuer (for example, MNO) as an ISD and performing overall necessary management functions and software of an SSD for a business partner of the card issuer (for example, an application provider such as a bank and a credit card company) to securely manage service software and information thereof (for example, banking applets and account information).

However, due to a physical difference from a conventional detachable SIM, the eSIM environment involves management of SIM data in a software form, and accordingly methods based on GLOBALPLATFORM technology are currently under discussions. However, a structural definition that an MNO owns an ISD key and develops an eSIM business based on the ISD key is needed due to issues about ownership of the ISD key and initiative in eSIM based business (communications and optional services) on GLOBALPLATFORM.

Thus, the present invention discloses an eSIM management method on the basis of authorized management and delegated management on an existing GLOBALPLATFORM specification, particularly a basic opening structure and a structure and a process of switching to a different mobile carrier.

Figure 3:
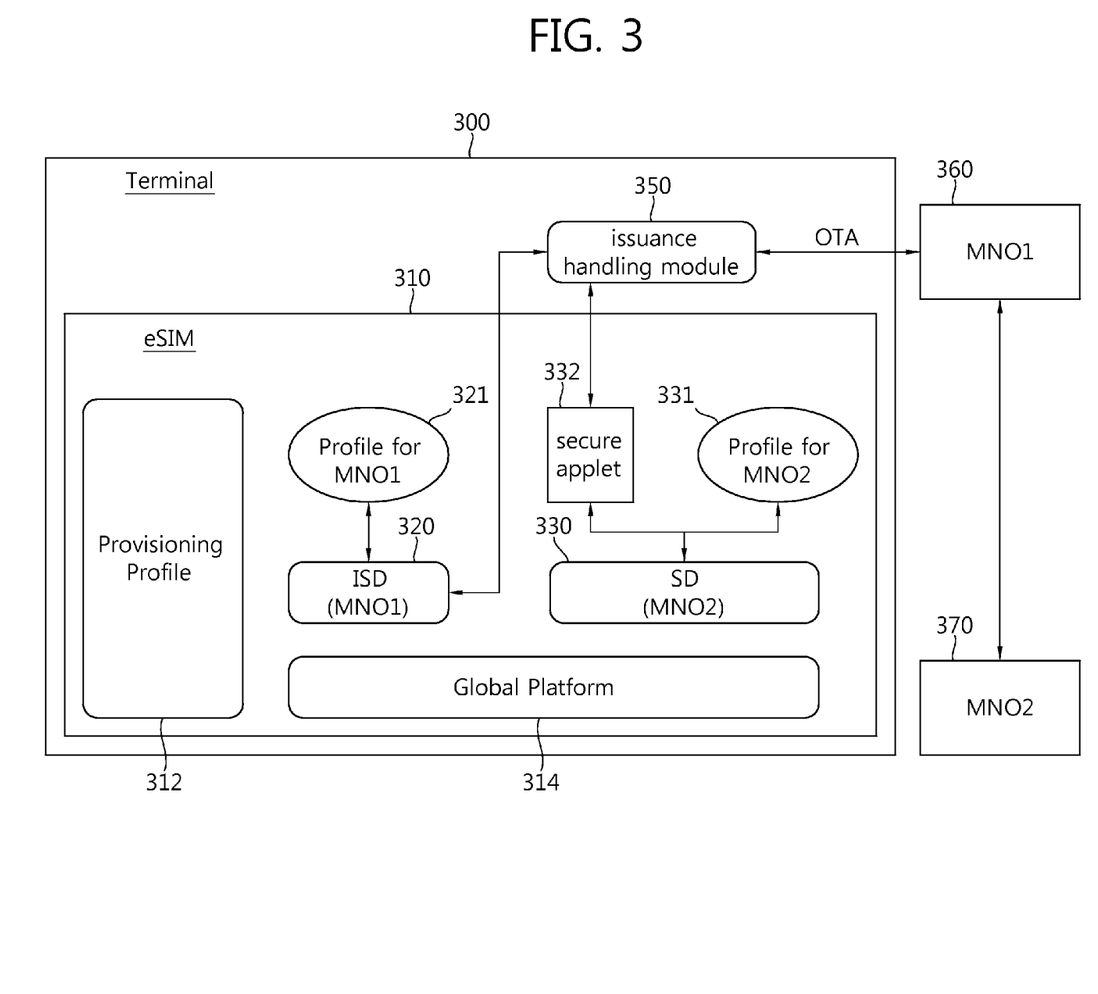
FIG. 3 illustrates an internal structure of an eSIM and relationship between the eSIM and external MNOs according to an exemplary embodiment of the present invention.

FIG. 3 illustrates an internal structure of an eSIM and relationship between the eSIM and external MNOs according to an exemplary embodiment of the present invention.

A system according to the present embodiment includes a terminal 300 including an eSIM 310 and one or more MNO systems 360 and 370.

In the following description, MNO1 is defined as an initially opening MNO and MNO2, MNO3, etc. are defined as additional MNOs.

An issuance handling module 350 is installed in the terminal and conducts a issuing process needed for an MNO change via communications with MNO1. In this process, the "issuance handling module" may need to conduct secure communications with MNO1 and be disposed and operate in a safe space of a device or terminal to be protected against external hacking.

When a request for decryption of an encrypted profile of an MNO system, MON2, is received from the eSIM, the issuance handling module 350 requests decryption of the profile of MON2 from a secure applet for MNO2, receives the decrypted profile of MNO2 in response, and transmits the profile to the ISD in the eSIM, which will be described in detail with reference to FIG. 4.

The issuance handling module serves to conduct communications with an outside of the eUICC-installed terminal for eUICC provisioning and provisioning management, and may be referred to as a different term, such as a communication module, a provisioning module, an issuing module or an opening module.

The eSIM 310 includes a provisioning profile 312, GLOBALPLATFORM 314, and one ISD 320 and one or more SDs 330 in a higher level than GLOBALPLATFORM.

The ISD is a main and essential on-card representative for a card administrator that is generally a card issuer, which denotes a main on-card entity supporting communication requirements, control and security of the card administrator.

The ISD, which is for an initially opening MNO, serves to manage a profile of MNO1, particularly, to conduct ISD key authentication with the eSIM in an MNO change, to generate an SD for an additional MNO (MNO2 or MNO3), to inject a prior SD key value into each SD and to install a secure applet for each SD. Moreover, when an encrypted profile is received from an additional MNO, the ISD may serve to additionally encrypt the profile using an ISD key and transmit the profile, which will be described in detail with reference to FIG. 4.

Each SD 330 is generated by MNO1 and is for each additional MNO.

Further, the eSIM includes profiles 321 and 331 of one or more MNOs, wherein the profile 321 of the initially opening MNO, MNO1, is managed by the ISD 320 and the profile 331 of an additional MNO, MNO2, is managed by the SD 330.

A secure applet 332 for key generation and secure arithmetic operations is installed in each SD and is designed to implement an instruction only after MAC authentication with an associated SD based on an SD key or public key encryption.

Figure 4:
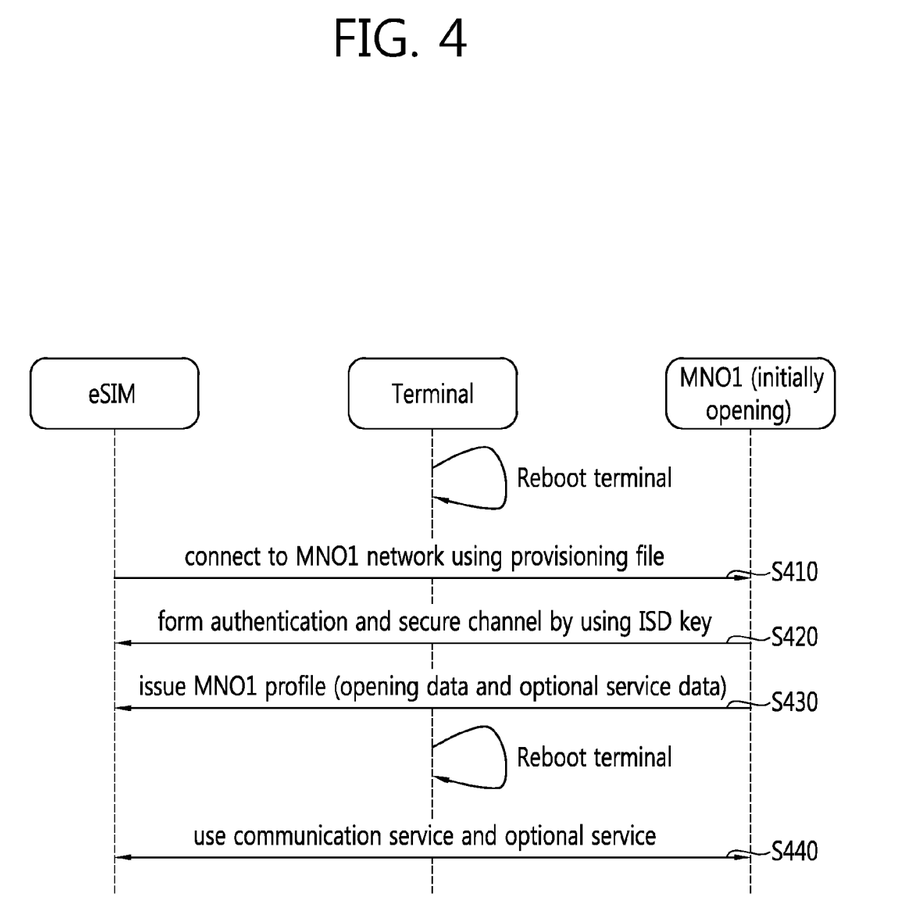
FIG. 4 is a flowchart illustrating a provisioning process using an eSIM according to an exemplary embodiment of the present invention.

The secure applet 332 of each SD may authenticate a new SD key value transmitted from a receiving MNO system (MNO2 or MNO3) according to an MNO change, transmit only a public key to the receiving MNO system after generating key pairs for the receiving MNO, and decrypt an encrypted profile of the receiving MNO with a private key corresponding to the public key when the encrypted profiled is received, wherein decryption may be carried out by a request from the issuance handling module installed in the terminal, which will be described in detail with reference to FIG. 4.

The secure applet in the eUICC conducts credential management and profile management, generates an encryption key (public key/private key for each MNO) and performs secure arithmetic operations using the encryption key. The secure applet may be also referred to as a secure module, an encryption key generation module or an encryption key processing module.

Terms used in the specification are defined as follows.

An MNO is a wireless service provider, which refers to an entity to provide customers with communication services through a mobile network.

Provisioning is a process of loading a profile into an eUICC, and a provisioning profile refers to a profile used for a device to connect to a communication network so as to conduct provisioning of another provisioning profile and operation profile.

Subscription refer to commercial relationship between a subscriber and a wireless communication service provider.

A profile is a combination of a file structure, data and an application to be provisioned to the eUICC or managed in the eUICC, which includes all information present in the eUICC, such as an operation profile as operator information, a provisioning profile for provisioning and a profile for a policy control function (PCF).

An operation profile or operator information refers to any kind of profile related to operational subscription.

Card content refers to a code and application information (not application data) included in a card under responsibility of the OPEN, for example, an executable load file and an application instance.

A card issuer is an entity that owns a card, which is responsible for all aspects of the card.

An ISD is a main on-card entity that provides supports for communication requirements, control and security of a card administrator.

An SD is an on-card entity that supports control, security and communication requirements of an off-card entity, for example, a card issuer, an application provider or a controlling authority.

Delegated management (DM) means pre-authorized card content change conducted by an authorized application provider, and a token is a cryptographic value provided by a card issuer to confirm that a delegated management operation is authorized.

A controlling authority is an entity having privilege to maintain control of card content through an authority to verify a data authentication pattern (DAP).

The MNO1 system 360 and the MNO2 system 370 may serve to perform GLOBALPLATFORM-based card management functions (establishing a communication channel for mutual authentication with an SIM and security and issuing applications and data). MNO1 and MNO2 may need to be under prior agreement for transfer to another service provider.

Hereinafter, details on GLOBALPLATFORM technology relevant to the present invention will be described.

An SD is an privileged application, which has cryptographic keys used to support a secure channel protocol operation or to authorize a card content management function.

Each application and each executable load file may be related to the SD, wherein the application may use a relevant encryption service of the SD.

All cards have one essential SD, which is referred to as an ISD. Due to a card supporting multiple SDs, an application provider may manage own applications through a own SD of the application provider and provide an encoded service using a key completely separated from a card issuer.

The SD is responsible for management of its own key, and accordingly applications and data from a plurality of different application providers may be present in the same card without violating privacy and integrity of each application provider.

An encryption process related to keys of all SDs may provide secure support for communications while an application of an application provider is personalized and enables safe communications while an application not including secure messaging keys of the SDs is implemented.

An ISD generally operates as a single particular SD but has distinguished features from other SDs.

That is, although the ISD is an application initially installed in the card, the ISD is not necessarily loaded or installed in the same manner for each application. Further, the ISD has a card life cycle state internally and thus does not have an SD life cycle state. When a privileged application is removed, the ISD has authority to reset the card.

In addition, when an application implicitly selected on the same logic channel of an I/O interface of the same case is removed, the ISD becomes an implicitly selected application and may be selected according to a SELECT instruction not having a command data field.

An application including an SD may use a service of a relevant SD to the application to provide a secure channel session and another encoding service. The application does not need to know an SD application identifier (AID) in advance, while the GLOBALPLATFORM registry provides the SD AID and the OPEN provides a standard of the relevant SD to the application. Since the relevant SD may be changed by extradition, the application may not need to store the standard.

Extradition is a method to associate an application with another SD. Although an executable load file is first associated with an SD loading the load file, the load file is immediately extradited to another SD through implicit extradition or sequentially extradited to another SD through explicit extradition during a loading process.

An IDS is not for extradition, while an SD may be associated with itself through extradition. An SD may be further separated from another SD using privilege allocated to the other SD, and consequently one or more associated layers may be formed on the card. A root of each layer becomes an SD associated with the root.

An application may access a service of a relevant SD. The application may rely on support for encoding from the SD using the service, securing confidentiality and integrity during personalization and runtime. The SD service may have characteristics as follows.

The SD starts a secure channel session on successful authentication of an on-card entity, unwraps a received instruction in the secure channel session by verification of integrity or decodes original data under secure confidentiality.

In addition, the SD controls a sequence of APDU instructions, decodes a confidential data block, and sets a security level of confidentiality or integrity which is applicable to a next inflow instruction or next outflow response. Further, the SD service closes the secure channel session and removes confidential data related to the secure channel session upon request.

Depending on whether to support a particular secure channel protocol, the SD may have a function of wrapping a response transmitted within the secure channel session by adding confidentiality, a function of encoding the original data under secured confidentiality, or a function of encoding a confidential data block and controlling a sequence of APDU responses.

The SD may simultaneously manage multiple secure channel sessions, that is, a plurality of applications selected in a plurality of logic channels each starting a secure channel, and control to manage only one secure channel session among a plurality of applications simultaneously selected to use services. When the SD supports simultaneously managing the multiple secure channel sessions, the SD may need to divide the multiple secure channel session and the logic channels thereof. When the SD does not support simultaneously managing the multiple secure channel sessions, the SD may reject a request for starting a new secure channel session when the request for opening a secure channel session is made to another logic channel different from a current secure channel session.

Also, the SD may receive a STORE DATA instruction toward one of associated applications. The SD unwraps the instruction according to a security level of the current secure channel session before the instruction is forwarded to the application.

The ISD may need to process an issuer identification number (IIN), a card image number (CIN), card recognition data and card issuer dedicated data. These data may be acquired from the card through a GET DATA instruction.

An IIN is used by an off-card entity to associate a card with a particular card management system. The IIN generally includes identification information on an issuer defined by ISO 7812 and transmitted by a tag "42" of ISO/IEC 7816-6. An IIN data element has a variable length.

A CIN is used by a card management system to uniquely identify a card in a card base. The CIN is a unique value and is transmitted by a tag "45" (data of a card issuer) defined in ISO/IEC 7816 and allocated by the card issuer defined as the IIN. A CIN data element also has a variable length.

A card management system may need to know information on a card before conducting interactions with the card. The information may include information on a kind of the card and information on available secure channel protocols. Card recognition data is a mechanism to provide the information on the card and prevents changes of trial and error.

An SD other than the ISD may be expressed as a supplementary security domain (SDD), and the SDD handles identification data on the SDD. The identification data on the SDD may include an SD provider identification number (SIN), an SD image number, SD management data and application provider dedicated data. These data may be obtained from the card through the GET DATA instruction.

An SIN is used by an off-card entity to associate an SD with a particular card management system. The SIN generally includes identification information on an SD provider defined by ISO 7812 and transmitted by the tag "42" of ISO/IEC 7816-6. An SIN data element has a variable length.

An SD image number is used by a card management system to uniquely identify an SD instance within a card. The SD image number may be a unique value and be transmitted by the tag "45" (data of a card issuer) defined in ISO/IEC 7816.

A card management system may need to know information on a card before conducting interactions with the card. The information may include information on a kind of the SD and information on available secure channel protocols.

SD management data is a mechanism to provide information on the SD and prevents changes of trial and error. The SD management data is included in a response to the SELECT instruction and returned, and may be included in a response to the GET DATA instruction and returned.

Information provided to the SD management data is required to sufficiently enable the card and initial communication but is not limited to particular requirements. The SD management data needs dynamically updating by the card.

After a profile or data needed for the receiving MNO is issued, the eSIM according to the present embodiment may change an SD key value into a unique SD key value recognized only by the receiving MNO system.

Hereinafter, an ISD key and an SD key used in one exemplary embodiment of the present invention will be described.

The ISD key and the SD key according to the present embodiment have characteristics as follows.

The ISD key or SD key includes a key identifier to identify each key in an on-card entity. A key includes one or more key components. For example, a symmetric key has one key component, while an asymmetric key includes a plurality of components. All key components share the same key identifier, and different key identifiers are used in one on-card entity to distinguish keys, purposes and functions thereof. There is no restriction or predetermined order in allocating key identifiers to keys, and non-consecutive key identifiers may be used in the same entity.

The SD key has a characteristic of an associated key version number. Different key versions may be used to distinguish a plurality of instances or versions of the same key in one on-card entity. There is no restriction or predetermined order in allocating key version numbers to a key.

Further, the SD key has a characteristic of an encryption algorithm, in which a particular key may be associated with only one encryption algorithm. A length of an encryption algorithm supporting a plurality of key lengths and access conditions for accessing or controlling a key may be characteristics of the SD key.

Such characteristics of the key may enable an identity, intended purposes and functions of an encryption key to be clearly directed to the on-card entity.

A particular key may be clearly identified in the on-card entity by a combination of a key identifier and a key version number, and an encryption algorithm and a key component are identified by a key type. A key and an algorithm are clearly distinguished in the entity, thereby preventing misuse of an encryption function. An off-card entity may acquire information on the SD key using the GET DATA instruction of a key information template (tag "E0").

Meanwhile, a method that the SD manages a key according to an exemplary embodiment of the present invention is as follows.

A key identifier and a key version number uniquely refer to each key in an on-card entity, and each key identifier/key version number combination represents a unique key slot in the entity.

Adding a key means allocating a new key slot with a new key value, a new key identifier or a new key version number. Replacing a key is associated with updating a key slot with a key version number related to a new key value. A key identifier still remains the same, and a previous key is not used any more.

An off-card key management system may need to know a key identification method performed by an on-card entity. A key identifier and a key version number may have random values with respect to a particular card, and these values may be changed from one key management method to another method.

An SD may need to store all key information provided via a PUT KEY instruction.

Three access conditions may be allocated to the SD key, which are access by the SD, access by an authorized user, for example, an associated application of the SD, other than the owner, and access by all authorized users including the owner of the SD key.

The access conditions to the SD key may be represented by one byte. For example, "00" represents any authorized user including the owner, which is a basic access condition with respect to a secure channel protocol key when not explicitly provided via the PUT KEY instruction, "01" represents the owner, that is, the SD, which is a basic access condition with respect to a token and DAP key when not explicitly provided via the PUT KEY instruction, and "02" represents an authorized user other than the owner, without being limited to the foregoing examples. Access control regulations applicable to a particular SD key may be enforced as follows.

To use a particular SD encryption service, an application asks the OPEN for reference to a secure channel interface, while the OPEN may identify an SD related to the application and provides reference to the secure channel interface corresponding to the application.

Further, the application may ask the SD for an encryption service via the secure channel interface, while the OPEN may allow access only by the related application.

Data and keys are managed in the following manner. When a data/key management request is received, a relevant SD manages the key/data according to access control regulations of the SD and a card life cycle is not in a CARD-_LOCKED or TERMINATED state.

When a DELETE KEY, PUT KEY or STORE DATA instruction is received, the SD conducting data or key management applies a secure communication policy of the SD, and an SD provider may apply a key management policy related to deletion of a key.

FIG. 4 is a flowchart illustrating a provisioning process using an eSIM according to an exemplary embodiment of the present invention.

As a prerequisite for the provisioning process and an MNO change process to be described below, a provisioning file is preinstalled in the eSIM and may be applied equally to all MNOs. Each MNO needs to allow access to a profile via a network so that the eSIM is managed through the provisioning profile.

As shown in FIG. 4, in the provisioning process using the eSIM according to the present embodiment, a terminal equipped with the eSIM connects to an MNO1 network using the provision profile of the eSIM when booted up (S410). Then, an MNO1 system establishes a mutual authentication and secure communication channel with the eSIM using an ISD key (S420). Subsequently, the MNO1 system issues the eSIM with an MNO1 profile, opening data for communications (for example, IMSI, Ki and OPc), data on optional services to be preinstalled (for example, infra-applets for transportation cards and credit cards) and additional data necessary for issuing through the secure communication channel (S430).

When the terminal is rebooted after the profile or data are completely issued in S430, the terminal conducts communications via the MNO1 network and utilizes optional services offered by MNO1 (S440).

Figure 5:
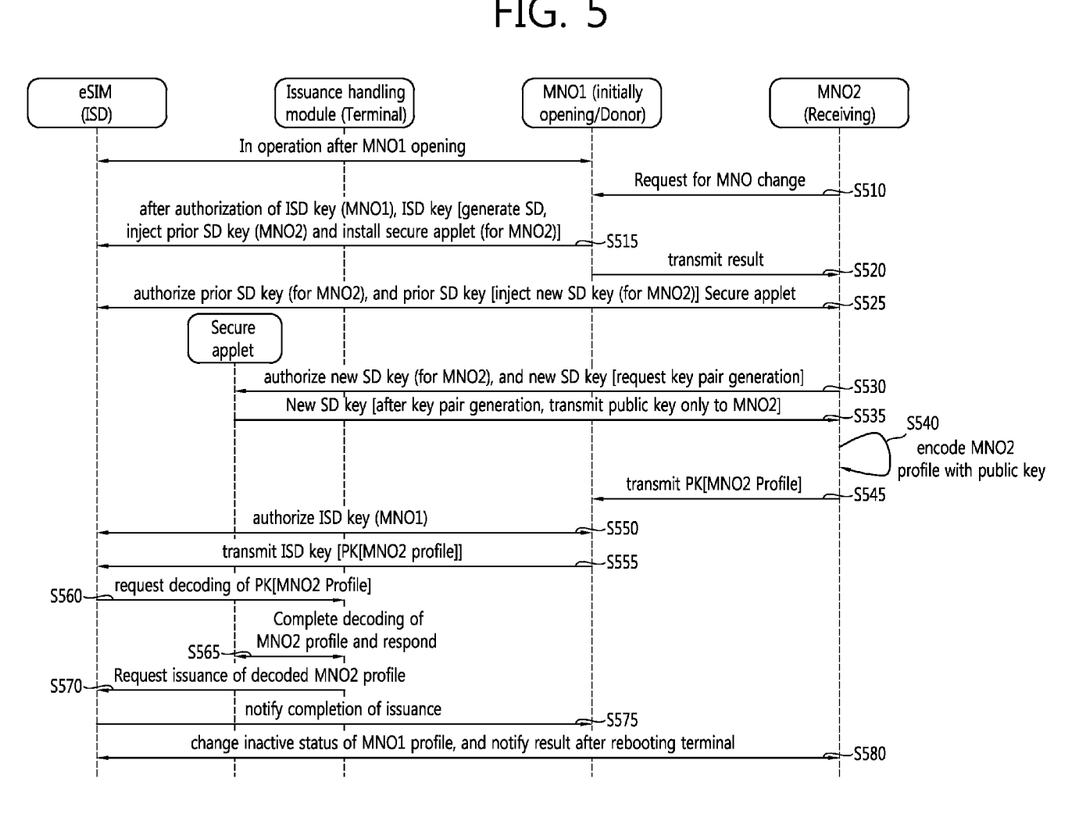
FIG. 5 is a flowchart illustrating an MNO change process using an eSIM according to an exemplary embodiment of the present invention.

FIG. 5 is a flowchart illustrating an MNO change process using an eSIM according to an exemplary embodiment of the present invention.

In FIG. 5, MNO1 is an initially opening MNO and donor MNO and MNO2 is a new receiving MNO after the MNO change.

In the MNO change process using the eSIM according to the present embodiment, an MNO2 system transmits a request message for a change to another service provider or an MNO change to an MNO1 system (S510).

In S511, the initially opening MNO and donor MNO, MNO1, conducts ISD authentication with the eSIM, generates an SD for the receiving MNO, MNO2, using an ISD key, injects a prior SD key provided in advance from the MNO2 system to the MNO1 system through a hardware security module (HSM), and installs a secure applet for key pair generation and secure arithmetic operations for an MNO2 profile (S515). In S511, the generated SD for MNO2, a prior SD key value and data for installation of the secure applet may be encrypted using the ISD key and transmitted, and the eSIM may decrypt the SD for MNO2, the prior SD key value and the data for installation of the secure applet to generate the SD for MNO2 having the SD key value injected in advance on GLOBALPLATFORM, as shown in FIG. 3, and install a needed secure applet.

Next, MNO1 notifies MNO2 that generation of the SD, injection of the prior SD key and installation of the applet are completed (S520).

MNO2 conducts authentication using the prior SD key through an MNO1 network, injects a new SD key value recognized only by MNO2 into the SD (S525), in which an instruction such as PUT KEY may be used, without being limited thereto. That is, the MNO2 system encrypts the new SD key value using the prior SD key and transmits the PUT KEY instruction to the eSIM, and the eSIM authenticates that the request is proper through the prior SD key value, extracts the new SD key value via decryption, and updates the SD key value with the new SD key value.

Subsequently, MNO2 conducts authentication of the SD for MNO2 using the new SD key and transmits an key pair generation request instruction encrypted using the new SD key to the secure applet (S530).

The secure applet in the eSIM generates a key pair for MNO2, that is, a public key/private key pair, according to the key pair generation request instruction, and encrypts only the public key using the new SD key to transmit to MNO2 (S535).

MNO2 encrypts (first encryption) an MNO2 profile using the transmitted public key (S540) and transmits the encrypted MNO2 profile (PK[MNO2 Profile]) to the initially opening MNO, MNO1 (S545).

MNO1 receiving the encrypted MNO2 profile (PK[MNO2 Profile]) from MNO2 conducts ISD key authentication with the eSIM (S550), additionally encrypts (second encryption) the MNO2 profile, encrypted using the public key, using the ISD key and transmits the MNO2 profile to the ISD in the eSIM (S555). Here, the second encrypted MNO2 profile may be represented as ISDkey[PK[MNO2 Profile]].

The ISD in the eSIM verifies the MNO2 profile encrypted with the public key using the ISD key and requests decryption of the MNO2 profile to the issuance handling module (S560). That is, the ISD of the eSIM may first decrypt the received second encrypted MNO2 profile ISDkey[PK[MNO2 Profile]] into the MNO2 profile encrypted with the public key of MNO2, that is, PK[MNO2 Profile], using the own ISD key thereof and transmit the MNO2 profile to the issuance handling module of the terminal, requesting second decryption.

Then, the issuance handling module requests decryption of the MNO2 profile to the secure applet of MNO2, and the secure applet decrypts the MNO2 profile encrypted with the public key using the private key generated by the secure applet, which corresponds to the public key of MNO2, to respond to the issuance handling module (S565). In this process, the issuance handling module or secure applet may verify that the request is a normal request through MAC verification.

Next, the issuance handling module transmits the completely decrypted MNO2 profile to the ISD of the eSIM (S570). That is, the issuance handling module of the terminal requests issuance of the decrypted MNO2 profile, transmitting the decrypted MNO2 profile to the eSIM.

The ISD of the eSIM conducts an issuing process based on the MNO2 profile transmitted from the issuance handling module. That is, in the issuing process, as in FIG. 4, MNO2 establishes a mutual authentication and secure communication channel with the eSIM using the ISD key and issues the eSIM with opening data for communications (for example, IMSI, Ki and OPc), data on optional services to be preinstalled (for example, infra-applets for transportation cards and credit cards) and additional data necessary for issuance through the secure communication channel. When the terminal is rebooted after the profile or data are completely issued, the terminal conducts communications via an MNO2 network and utilizes optional services offered by MNO2.

When the issuing process is completed, the eSIM transmits a result of the process to the initially opening MNO, MNO1 (S575).

MNO1 inactivates the MNO1 profile of the eSIM. The terminal is rebooted, and MNO1 notifies MNO2 that the entire issuing process is completed (S580).

Operations S510 to S580 may not need to be carried out separately, some of which may be omitted or one or more operations of which may be carried out in an integrated manner.

According to the foregoing process, an MNO may securely and quickly conduct an MNO change process, using technical specifications of GLOBALPLATFORM such as an ISD and SD as they are.

In addition, although not shown, a new optional service of MNO2 may be used after a switch or change to MNO2, which is enabled after S540 of FIG. 5, or an application (applet) needed for an optional service may be transmitted to MNO1 to request installation thereof.

That is, for instance, to transmit the application needed for the optional service to the eSIM, MNO2 encrypts (first encryption) the application with the transmitted public key and transmit the application to MNO1, and MNO1 conducts ISD key authentication with the eSIM, additionally encrypts (second encryption) the application using the ISD key and transmits the application to the ISD of the eSIM.

Then, the eSIM decrypts and installs information on the optional service application second encrypted in association with the issuance handling module, so that the optional service may be provided.

Figure 6:
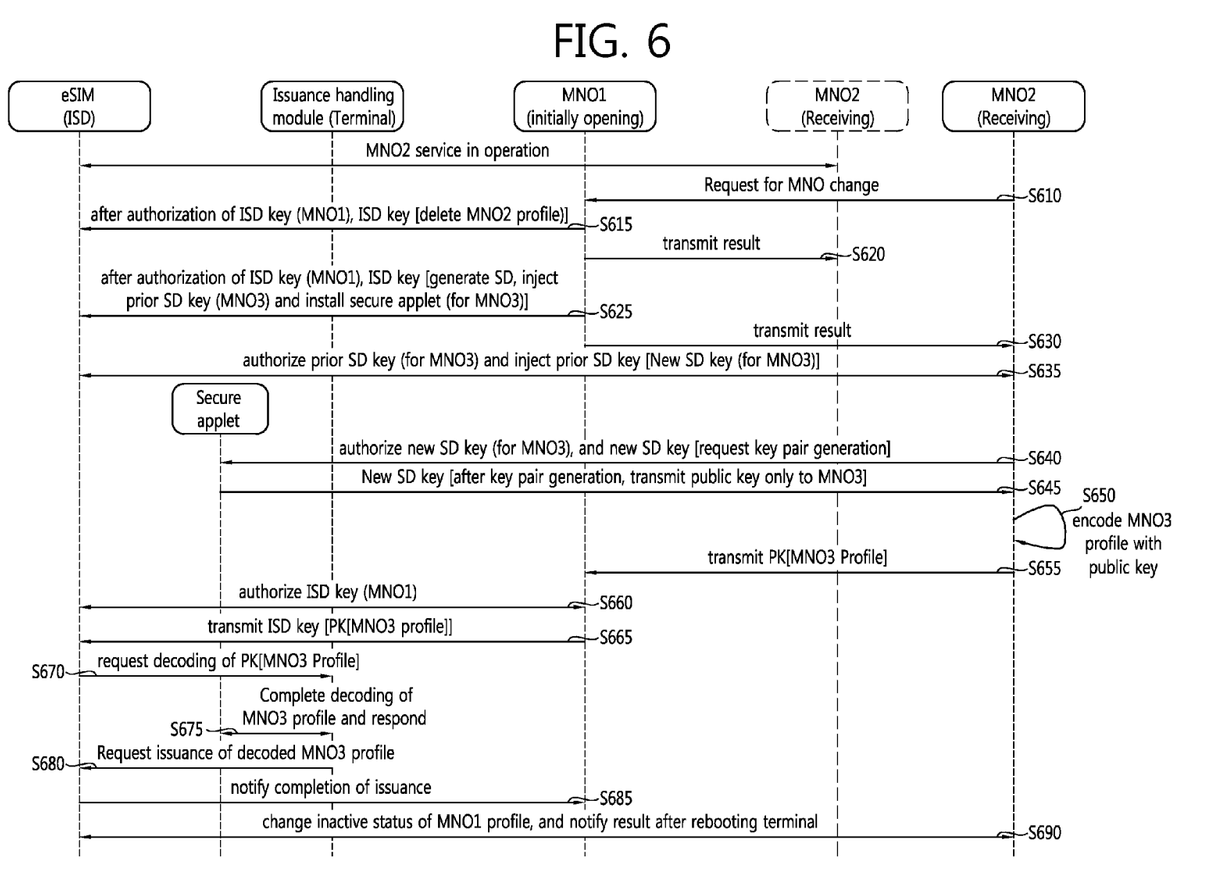
FIG. 6 is a flowchart illustrating an MNO change process using an eSIM according to another exemplary embodiment of the present invention, in which an initially opening MNO is not a donor or receiving MNO.

FIG. 6 is a flowchart illustrating an MNO change process using an eSIM according to another exemplary embodiment of the present invention, in which an initially opening MNO is not a donor or receiving MNO.

In FIG. 6, unlike FIG. 5 where the initially opening MNO is a donor MNO, MNO1 is the initially opening MNO, MNO2 is a donor MNO before an MNO change, and MNO3 is a new receiving MNO after the MNO change.

In the MNO change process using the eSIM according to the present embodiment, an MNO3 system transmits a request message for a change to another service provider or an MNO change to an MNO1 system as the initially opening MNO (S610).

Next, the MNO1 system conducts ISD key authentication with the eSIM using an ISD, deletes a profile of MNO2 as the donor MNO from the eSIM (S615), and notifies MNO2 of deletion of the profile (S620). That is, MNO1 encrypts an instruction signal to delete the MNO2 profile using an ISD key value and transmits the instruction signal to the eSIM, and the eSIM performs an MNO2 deletion instruction after ISD key authentication to delete the MNO2 profile.

Subsequent operations may be similar to operations from S515 of FIG. 5.

That is, the initially opening MNO, MNO1, conducts ISD authentication with the eSIM, generates an SD for the receiving MNO, MNO3, using an ISD key, injects a prior SD key provided in advance from the MNO3 system to the MNO1 system through a hardware security module (HSM), and installs a secure applet for key pair generation and secure arithmetic operations for an MNO3 profile (S525). That is, the generated SD for MNO3, a prior SD key value and data for installation of the secure applet may be encrypted using the ISD key and transmitted, and the eSIM may decrypt the SD for MNO3, the prior SD key value and the data for installation of the secure applet to generate the SD for MNO3 having the SD key value injected in advance on GLOBALPLATFORM, as shown in FIG. 3, and install a needed secure applet.

Next, MNO1 notifies MNO3 that generation of the SD, injection of the prior SD key and installation of the applet are completed (S630).

MNO3 conducts authentication using the prior SD key through an MNO1 network, injects a new SD key value recognized only by MNO3 into the SD (S635), in which an instruction such as PUT KEY may be used, without being limited thereto. That is, the MNO3 system encrypts the new SD key value using the prior SD key and transmits the PUT KEY instruction to the eSIM, and the eSIM authenticates that the request is proper through the prior SD key value, extracts the new SD key value via decryption, and updates the SD key value with the new SD key value.

Subsequently, MNO3 conducts authentication of the SD using the new SD key and transmits an key pair generation request instruction encrypted using the new SD key to the secure applet (S640).

The secure applet in the eSIM generates a key pair for MNO3, that is, a public key/private key pair, according to the key pair generation request instruction, and encrypts only the public key using the new SD key to transmit to MNO3 (S645).

MNO3 encrypts (first encryption) an MNO3 profile using the transmitted public key (S650) and transmits the encrypted MNO3 profile (PK[MNO3 Profile]) to the initially opening MNO, MNO1 (S655).

MNO1 receiving the encrypted MNO3 profile (PK[MNO3 Profile]) from MNO2 conducts ISD key authentication with the eSIM (S660), additionally encrypts (second encryption) the MNO3 profile, encrypted using the public key, using the ISD key and transmits the MNO3 profile to the ISD in the eSIM (S665).

The ISD in the eSIM verifies the MNO3 profile encrypted with the public key using the ISD key and requests decryption of the MNO3 profile to the issuance handling module (S670). That is, the ISD of the eSIM may first decrypt the received second encrypted MNO3 profile ISDkey[PK[MNO3 Profile]] into the MNO3 profile encrypted with the public key of MNO3, that is, PK[MNO3 Profile], using the own ISD key thereof and transmit the MNO3 profile to the issuance handling module of the terminal, requesting second decryption.

Then, the issuance handling module requests decryption of the MNO3 profile to the secure applet of MNO3, and the secure applet decrypts the MNO3 profile encrypted with the public key using the private key generated by the secure applet, which corresponds to the public key of MNO3, to respond to the issuance handling module (S685). In this process, the issuance handling module or secure applet may verify that the request is a normal request through MAC verification.

Next, the issuance handling module transmits the completely decrypted MNO3 profile to the ISD of the eSIM (S680). That is, the issuance handling module of the terminal requests issuance of the decrypted MNO3 profile, transmitting the decrypted MNO3 profile to the eSIM.

The ISD of the eSIM conducts an issuing process based on the MNO3 profile transmitted from the issuance handling module. When the issuing process is completed, the eSIM transmits a result of the issuing process to the initially opening MNO, MNO1 (S685).

In this state, since an MNO1 profile is already inactivated and the MNO2 profile is deleted in S615 or updated to the MNO3 profile, only the MNO3 profile is active.

The terminal is rebooted, and MNO1 notifies MNO3 that the entire issuing process is completed (S690).

Operations S610 to S690 may not need to be carried out separately, some of which may be omitted or one or more operations of which may be carried out in an integrated manner.

In the embodiment illustrated in FIG. 5, since the donor MNO is the initially opening MNO, the profile of the donor MNO is inactivated instead of being deleted. However, in the embodiment shown in FIG. 6, since the donor MNO is different from the initially opening MNO, the profile of the donor MNO is deleted.

Figure 7:
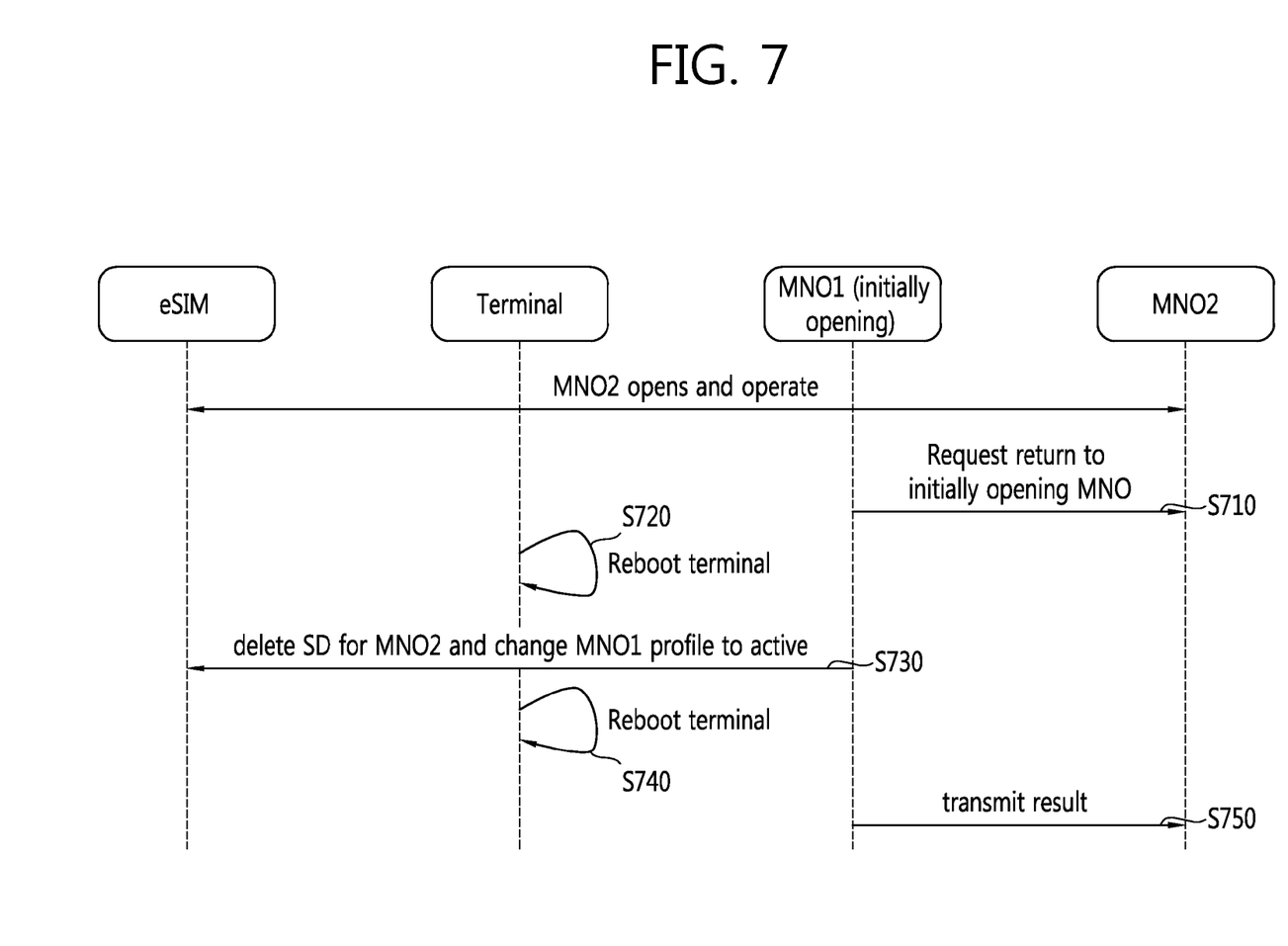
FIG. 7 is a flowchart illustrating a process of returning to an initially opening MNO using an eSIM according to an exemplary embodiment of the present invention.

According to the embodiment shown in FIG. 5, since the terminal may return to the initially opening MNO as illustrated in FIG. 7, the profile of the initially opening MNO is just inactivated instead of being deleted.

FIG. 7 is a flowchart illustrating a process of returning to an initially opening MNO using an eSIM according to an exemplary embodiment of the present invention.

In FIG. 7, a terminal returns from MNO2 currently in service to MNO1 as the initially opening MNO.

In the process of returning to the initially opening MNO using the eSIM according to the present embodiment, MNO1 asks MNO2 for a change to the initially opening MNO (S710).

The terminal is rebooted (S720) and connects to a network of MNO1 through a provisioning file. MNO1 deletes a profile of MNO2 (including an SD) using an ISD key and renders an inactivated profile of MNO1 activated (S730).

Then, when the terminal rebooted (S740), the terminal performs communications via the network of MNO1 and utilizes optional services offered by MNO1 as the terminal previously did. The MNO1 system notifies the MNO2 system that the terminal completely returns to the initially opening mobile carrier (S750).

According to the present invention described above, an MNO holding an IDS key may issue an MNO profile to a terminal and enables the terminal to change to another mobile carrier (another MNO) without changing existing SIM technology in an eSIM environment. Accordingly, the MNO holding the ISD key may continue to secure initiative in communication opening and optional service business based on standard technologies in the eSIM environment.

Further, although not described in detail to avoid redundancy, the eSIM and the MNO systems that conduct provisioning and an MNO change using a key pair (public key/private key) dynamically created and GLOB ALPLATFORM specifications may be embodied as computer readable programs.

These programs may include codes in programming languages such as C, C++, JAVA and machine codes readable by a computer processor or CPU so that the computer reads the programs recorded in recording media to conduct the foregoing functionalities.

The codes may include functional codes related to functions defining the aforementioned functionalities and control codes related to an execution procedure needed for the computer processor to execute the functionalities according to a preset procedure.

Further, the codes may further include memory reference related codes regarding additional information needed for the computer processor to perform the functionalities or a location or address of an internal or external memory that media refer to.

In addition, when the computer processor needs communications with a remote computer or server to perform the functionalities, the codes may further include communication related codes regarding how the computer processor communicates with which remote computer or server using a wire-based and/or wireless communication module and what kind of information or media the computer processor transmits or receives in communications.

Functional programs, relevant codes and code segments to implement the present invention may be readily inferred or modified by programmer skilled in the art in view of a system configuration of the computer that reads the recording media to execute the programs.

Examples of computer-readable recording media including the programs may include ROMs, RAMs, CD ROMs, magnetic tapes, floppy disks and optical media devices.

Further, the computer-readable recording media including the programs may be distributed to a computer system connected via a network, and accordingly computer-readable codes may be stored and implemented in distributed mode. In this case, at least one of a plurality of distributed computers may implement part of the functionalities and transmit the implementation result to at least another of the distributed computers, and the other computer receiving the result may implementation part of the functionalities and provide the implementation result to other distributed computers.

Particularly, a computer-readable recording medium including an application for executing a plurality of functions or methods related to eUICC authentication information according to the exemplary embodiment of the present invention may be an application store server, a storage medium, such as a hard disk, included in an application provider server, such as a web server associated with the application or corresponding service, or an application provider server.

Although elements shown in the exemplary embodiments of the present invention are described as being constituted or operate independently, the present invention is not limited to the illustrated embodiments. That is, one or more selective elements may be combined to operate within the scope of the present invention. Further, each element may be constructed by a separate hardware constituent, while part or the whole of these elements may be also selectively combined to form a computer program having a program module that conducts some or all combined functions of one or a plurality of hardware constituents. Codes and code segments to constitute the computer program may be easily inferred by those skilled in the art. The computer program is stored in computer-readable media and read and implemented on the computer to achieve the exemplary embodiment of the present invention. The media storing the computer program may include magnetic recording media, optical recording media and carrier wave media.

The terms "including" "comprising" or "having" may be construed to denote a certain constituent element, but may not be construed to exclude the existence of or a possibility of an addition of one or more other constituent elements. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While a few exemplary embodiments have been shown and described with reference to the accompanying drawings, it will be apparent to those skilled in the art that various modifications and variations can be made from the foregoing descriptions without departing from the essence of the present invention. The exemplary embodiments are provided not to restrict the concept of the present invention but to illustrate the present invention and do not limit the scope of the present invention. The scope of the invention is defined by the appended claims, and all differences within the scope will be construed as being included within the appended claims of the present invention.

The invention claimed is:

1. A method of changing a mobile network operator (MNO) using an embedded Subscriber Identity Module (eSIM) linked to at least one MNO, the method comprising:
 conducting, by an initially opening MNO system, issuer security domain (ISD) authentication with the eSIM when an MNO change from a donor MNO to a receiving MNO is requested;
 generating a security domain (SD) and a secure applet for a receiving MNO, by the initially opening MNO system, using an issuer security domain (ISD) key; and
 encrypting a profile of the receiving MNO based on the secure applet by the receiving MNO and transmitting the profile to the eSIM through the initially opening MNO,
 wherein the eSIM stores an issuer security domain (ISD) for the initially opening MNO and a profile of the at least one MNO,
 wherein a public key and a private key corresponding to the public key are generated by the secure applet.

2. The method of claim 1, wherein the initially opening MNO second-encrypts the transmitted profile, first-encrypted by the receiving MNO using the public key, using the ISD and transmits the profile to the eSIM.

3. The method of claim 2, further comprising decrypting the profile of the receiving MNO by the secure applet using a private key.

4. The method of claim 1, further comprising inactivating a profile of the initially opening MNO in the eSIM by the donor MNO.

5. The method of claim 1, wherein the donor MNO is the initially opening MNO.

6. The method of claim 1, further comprising encrypting an application or data needed for an optional service using the public key and transmitting the application or data to the initially opening MNO by the receiving MNO;
 conducting issuer security domain (ISD) key authentication with the eSIM, second-encrypting the data, encrypted with the public key, using an ISD key and transmitting the data to the eSIM by the donor MNO; and
 decrypting the encrypted data using a secure applet installed in the eSIM by the eSIM.

7. The method of claim 1, when an initially opening MNO is not a donor MNO or receiving MNO, the method further comprising:
 receiving an MNO change request from the receiving MNO by the initially opening MNO;
 deleting a profile of the donor MNO from the eSIM by the initially opening MNO after conducting issuer security domain (ISD) key authentication with the eSIM using an ISD.

8. An embedded Subscriber Identity Module (eSIM) comprising:
 an issuer security domain (ISD) and a profile for an initially opening mobile network operator (MNO), the initially opening MNO conducting ISD authentication with the eSIM when an MNO change from a donor MNO to a receiving MNO is requested;

a security domain (SD), a profile and a set of a secure applet for one or more additional MNOs; and a provisioning file for the initially opening MNO, wherein the secure applet is installed according to a request from the initially opening MNO for key generation and secure arithmetic operations, generates a key pair comprising a public key and a private key corresponding to the public key for one of the additional MNOs based on authentication of a new SD key transmitted from the additional MNO and transmits only the public key to the additional MNO.

9. The eSIM of claim 8, wherein the secure applet decrypts an encrypted profile using the private key when the encrypted profile using the public key is received from the additional MNO.

10. The eSIM of claim 8, wherein the secure applet conducts decryption according to a request from an issuance handling module disposed outside the eSIM.

11. The eSIM of claim 9, wherein the ISD authentication is conducted with the initially opening MNO at least one of when the SD for the additional MNOs and the secure applet are generated and when the encrypted profile is decrypted by the secure applet.

12. The eSIM of claim 10, wherein the issuer security domain conducts an issuing process based on the additional MNOs profile transmitted from the issuance handling module, the profile for the initially opening MNO is inactivated.

13. The eSIM of claim 8, wherein a SD key provided in advance from the additional MNOs system to the initially opening MNO system is injected when the security domain (SD) for the additional MNOs is generated.

14. The eSIM of claim 8, when the initially opening MNO system is not a donor MNO system or receiving MNO system and the initially opening MNO system receives a request for an MNO change from the receiving MNO system, a profile for the donor MNO system is deleted.

* * * * *